(12) United States Patent
Wang et al.

(10) Patent No.: US 10,379,659 B2
(45) Date of Patent: Aug. 13, 2019

(54) METHOD AND APPARATUS FOR GENERATING A PERSONALIZED INPUT PANEL

(71) Applicant: BAIDU ONLINE NETWORK TECHNOLOGY (BEIJING) CO., LTD., Beijing (CN)

(72) Inventors: Tiebin Wang, Shanghai (CN); Yixiang Wang, Shanghai (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/412,379

(22) PCT Filed: Sep. 18, 2014

(86) PCT No.: PCT/CN2014/086846
§ 371 (c)(1),
(2) Date: Dec. 31, 2014

(87) PCT Pub. No.: WO2015/090092
PCT Pub. Date: Jun. 25, 2015

(65) Prior Publication Data
US 2016/0266698 A1   Sep. 15, 2016

(30) Foreign Application Priority Data
Dec. 17, 2013 (CN) .......................... 2013 1 0692810

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0425* (2013.01); *G06F 3/0487* (2013.01);
(Continued)

(58) Field of Classification Search
None
See application file for complete search history.

(56) References Cited

U.S. PATENT DOCUMENTS

2008/0226136 A1   9/2008   Takaku
2009/0237361 A1   9/2009   Mosby et al.
(Continued)

FOREIGN PATENT DOCUMENTS

CN   101727535 A   6/2010
CN   102467330 A   5/2012
(Continued)

OTHER PUBLICATIONS

Wirayuda, T. A. B. et al.; "Implementation of Feature extraction based Hand Geometry in Biometric Identification System"; 2013 Intl. Conference of Information and Communication Technology (ICoICT), pp. 259-263 (5 pages).

*Primary Examiner* — Christopher J Kohlman
(74) *Attorney, Agent, or Firm* — Nixon Peabody LLP

(57) ABSTRACT

The present invention provides a method for generating a personalized input panel in a user equipment, wherein the method comprises the following steps: a. obtaining hand shape information of a user; b. comparing the hand shape information of the user with predetermined hand shape information, to obtain hand shape feature information of the user; c. generating a personalized input panel suitable for the user based on the hand shape feature information. According to the solution of the present invention, a personalized input panel that conforms to the hand shape features and use habits of a user may be provided.

17 Claims, 3 Drawing Sheets

(51) Int. Cl.
*G06F 3/042* (2006.01)
*G06K 9/62* (2006.01)
*G06T 7/60* (2017.01)
*G06F 3/0487* (2013.01)
*G06K 9/00* (2006.01)

(52) U.S. Cl.
CPC ........ *G06F 3/0488* (2013.01); *G06F 3/04883* (2013.01); *G06F 3/04886* (2013.01); *G06K 9/00382* (2013.01); *G06K 9/6202* (2013.01); *G06T 7/60* (2013.01); *G06T 2207/30196* (2013.01)

(56) References Cited

U.S. PATENT DOCUMENTS

| | | | |
|---|---|---|---|
| 2010/0127995 A1 | 5/2010 | Rigazio et al. | |
| 2010/0134423 A1* | 6/2010 | Brisebois | G06F 3/03547 345/173 |
| 2010/0259561 A1* | 10/2010 | Forutanpour | G06F 3/0216 345/660 |
| 2011/0102335 A1* | 5/2011 | Miyamura | G06F 3/04886 345/173 |
| 2011/0157090 A1* | 6/2011 | Parihar | G06F 3/04886 345/175 |
| 2012/0281884 A1 | 11/2012 | Whillock et al. | |
| 2013/0019191 A1* | 1/2013 | Arnold | G06F 3/04886 715/765 |
| 2013/0109369 A1* | 5/2013 | Forutanpour | A61B 5/1072 455/418 |
| 2013/0300668 A1 | 11/2013 | Churikov et al. | |
| 2014/0191974 A1* | 7/2014 | Sako | G06K 9/00288 345/168 |

FOREIGN PATENT DOCUMENTS

| | | |
|---|---|---|
| CN | 102736829 A | 10/2012 |
| CN | 103329070 A | 9/2013 |
| CN | 103699882 A | 4/2014 |
| EP | 1466242 | 10/2004 |
| JP | 2009-301094 A | 12/2009 |
| JP | 2012-027581 A | 2/2012 |
| JP | 2013-127740 A | 6/2013 |
| WO | WO-03/062978 | 7/2003 |

\* cited by examiner

METHOD AND APPARATUS FOR GENERATING A PERSONALIZED INPUT PANEL

REFERENCE TO RELATED APPLICATIONS

The present application is a national stage of PCT/CN2014/086846, filed Sep. 18, 2014, which claims priority to Chinese Patent Application No. 201310692810.3, filed Dec. 17, 2013. The contents of those applications are hereby incorporated by reference in their entirety.

FIELD OF THE INVENTION

The present invention relates to the field of computer technology, and more specifically, to a method and apparatus for generating a personalized input panel.

BACKGROUND

In the prior art, an available pattern of an input panel on a user equipment, particularly on a touch-screen device, is usually fixed. However, discrepancies always exist in between different users when using the input panel, such that this kind of fixed input panel can hardly be adapted to the user's input habits.

SUMMARY the present invention is providing a method and apparatus for generating a personalized input panel.

According to one embodiment of the present invention, there is provided a method for generating a personalized input panel in a user equipment, wherein the method comprises the following steps:
 a. obtaining hand shape information of a user;
 b. comparing the hand shape information of the user with predetermined hand shape information, to obtain hand shape feature information of the user;
 c. generating a personalized input panel for the user based on the hand shape feature information.

According to another embodiment of the present invention, there is provided an input panel generating apparatus for generating a personalized input panel in a user equipment, wherein the input panel generating apparatus comprises:
 a first obtaining module configured to obtain hand shape information of a user;
 a comparing module configured to compare the hand shape information of the user with predetermined hand shape information, to obtain hand shape feature information of the user;
 a generating module configured to generate a personalized input panel for the user based on the hand shape feature information.

Compared with the prior art, the present invention has the following advantages: 1) the user equipment compares the hand shape information of the user and standard hand shape information, obtains an input panel satisfying the user's personalized demands, enhances the accuracy of the user's touch operations on the input panel, and thus lowers the possibility of occurrence of input operations caused by mistouch of the user; 2) by displaying the location indication information on the screen, the user equipment lets the user to try best to place a hand within the location indication information when shooting the hand shape image, so as to better control the distance between the hand and the camera lens, thereby reducing the impact of the location of the hand on analyzing, by the user equipment, the obtained hand shape image when the user is shooting the hand shape image; 3) the user equipment may adjust the input panel in conjunction with the user's hand shape feature information and the touch point information, so as to generate a personalized input panel satisfying the user's needs, such that the generated personalized input panel can more satisfy the user's use habits.

BRIEF DESCRIPTION OF THE ACCOMPANYING DRAWINGS

Other features, objectives, and advantages of the present invention will become more apparent through reading the following detailed description of the non-limiting embodiments with reference to the accompanying drawings.

In the accompanying drawings, the same or similar reference numerals represent the same or similar parts.

DETAILED DESCRIPTION

Hereinafter, further detailed description will be made to the present invention with reference to the accompanying drawings.

Figure 1:
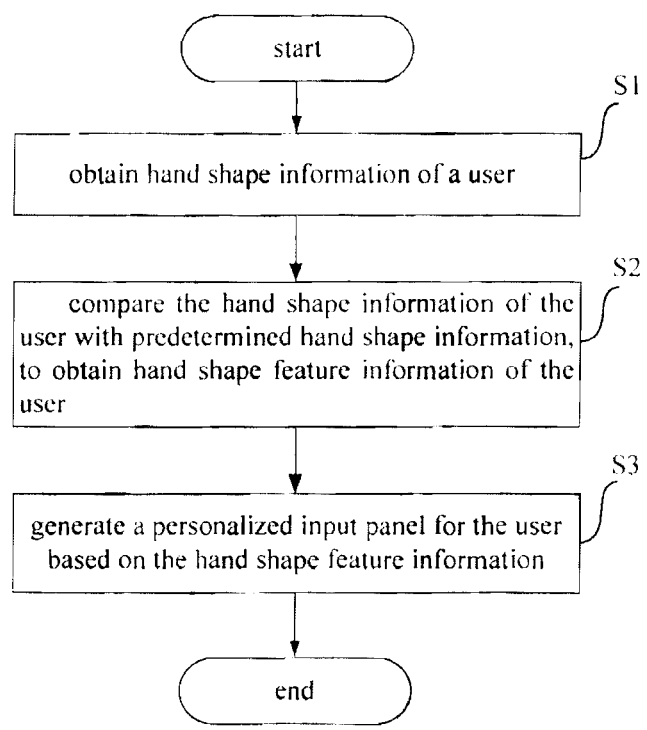
FIG. 1 shows a flow diagram of a method for generating a personalized input panel in a user equipment according to one preferred embodiment of the present invention.

FIG. 1 shows a flow diagram of a method for generating a personalized input panel in a user equipment according to one preferred embodiment of the present invention.

Herein, the method according to the present embodiment is mainly implemented via a user equipment; preferably, the user equipment has a touch input device, e.g., the display of the user equipment is a touch screen, the user equipment has a virtual keypad, etc.; preferably, the user equipment includes, but not limited to, a PC machine, a tablet, a smart phone, a PDA, an IPTV, etc.; preferably, the user equipment is a mobile device.

It should be noted that the user equipment is only exemplary, and other existing or future possibly developed user equipments, if applicable to the present invention, should be included within the protection scope of the present invention, and are incorporated here by reference.

The method according to the present embodiment comprises step S1, step S2, and step S3.

In step S1, the user equipment obtains hand shape information of a user.

Herein, the hand shape information includes any information that can reflect the information of the shape of the hand. Preferably, the hand shape information includes, but not limited to: the overall length-width ratio of the hand, the proportion of the fingers over the length of the whole hand; the thickness of the fingers; the width of the palm; and length proportion between respective fingers, etc.

Specifically, the implementation manners for the user equipment to obtain the hand shape information of the user include, but not limited to, the following:

1) the user equipment directly obtains the hand shape information of the user stored in the user equipment.

For example, the user equipment may pre-store his/her hand shape information into the user equipment; then the user equipment may directly obtain the hand shape information of the user as stored in the user equipment when the user uses the user equipment to generate a personalized input panel.

It should be noted that the above example is only for better illustrating the technical solution of the present invention, not intended to limit the present invention. Those skilled in the art should understand that any implementation manner of directly obtaining the hand shape information of the user stored in the user equipment should be included within the scope of the present invention.

2) the user equipment obtains the hand shape information of the user stored in the network device.

For example, the user may pre-store its hand shape information in a network device; then the user equipment may obtain the hand shape information of the user stored in the network device by accessing the network device when the user uses the user equipment to generate a personalized input panel.

It should be noted that the above example is only for better illustrating the technical solution of the present invention, not intended to limit the present invention. Those skilled in the art should understand that any implementation manner of obtaining the hand shape information of the user from a network device should be included within the scope of the present invention.

3) the user equipment obtains the hand shape information of the user based on the image shot by the user. In this embodiment, step S1 further comprises step S11 and step S12.

In step S11, the user equipment obtains a hand shape image shot by the user.

Herein, the manner in which the user equipment obtains a hand shape image shot by the user includes, but not limited to:

a) the user equipment extracts a hand-shape image shot by the user from among images already stored in the user equipment.

For example, the user equipment extracts a certain hand shape image from its album as the hand shape image shot by the user according to the user's selection.

b) step S11 further comprises step S11-1 and step S11-2.

In step S11-1, the user equipment invokes a camera of the user equipment and displays location indication information on the screen, wherein the location indication information is for indicating an appropriate location of a hand on the screen. For example, the location indication information may be embodied as a shape of a hand or a block; preferably, the location indication information is embodied as a shape of a standard hand shape.

Preferably, the camera of the user equipment invoked by the user equipment is a front-facing camera.

Next, the user may put a hand before the camera, and after the hand displayed on the screen is located at an appropriate location indicated by the location indication information, the shooting operation is performed.

Next, in step S11-2, the user equipment obtains the hand shape image based on the shooting operation of the user.

For example, in step S11-1, the user equipment invokes its front camera and displays a block indicating an appropriate location of the hand on the screen; and in step S11-2, the user equipment obtains the hand shape image in the block based on the user's shooting operation on the image of the hand placed within the block through the front camera.

It should be noted that the above example is only for better understanding the technical solution of the present invention, not intended to limit the present invention. Those skilled in the art should understand, any implementation manner of obtaining the hand shape image shot by the user should be included within the scope of the present invention.

In step S12, the user equipment extracts the hand shape information from among hand shape images obtained from step S11.

Herein, the user equipment may extract the hand shape information from among hand shape images in a plurality of manners. For example, obtain hand shape information by analyzing the image and extracting the hand shape contour.

It should be noted that the above example is only for better understanding the technical solution of the present invention, not intended to limit the present invention. Those skilled in the art should understand, any implementation manner of extracting the hand shape information from among the hand shape images should be included within the scope of the present invention.

It should be noted that the above example is only for better understanding the technical solution of the present invention, not intended to limit the present invention. Those skilled in the art should understand, any implementation manner of obtaining the hand shape information of the user should be included within the scope of the present invention.

In step S2, the user equipment compares the hand shape information of the user with predetermined hand shape information, to obtain hand shape feature information of the user. Wherein, the predetermined hand shape information may be hand shape information of a standard hand.

Wherein, the hand shape feature information may include the feature information corresponding to the hand shape information. Preferably, the hand shape feature information includes, but not limited to: the overall length-width ratio feature of the hand; the proportion feature of the fingers over the length of the overall hand; the thickness feature of fingers; the width feature of the palm; the length proportion feature between respective fingers, etc.

For example, the user equipment compares the hand shape information of the user with predetermined hand shape information, obtaining that the proportion of the fingers of the user over the length of the whole hand is lower than the proportion of the fingers over the length of the whole hand in a standard hand shape, then the hand shape feature information of the user as obtained by the user equipment is that the proportion of the fingers over the length of the whole hand is relatively low.

It should be noted that the above example is only for better understanding the technical solution of the present invention, not intended to limit the present invention. Those skilled in the art should understand, any implementation manner of comparing the hand shape information of the user with the predetermined hand shape information to obtain the hand shape feature information of the user should be included within the scope of the present invention.

In step S3, the user equipment generates a personalized input panel for the user based on the hand shape feature information.

Specifically, the implementation manner of generating, by the user equipment, a personalized input panel adapted for the user based on the hand shape feature information includes, but not limited to:

1) the user equipment directly calculates the locations of respective keys in the personalized input panel based on the hand shape feature information of the user, so as to generate a personalized input panel suitable for the user.

For example, the hand shape feature information of the user obtained by the user equipment is that the overall length-width ratio of the user is relatively large, then the user equipment first calculates the locations of often used keys in the input panel based on the overall length-width ratio of the hand of the user, and then calculates the locations of other non-often used keys based on the determined locations of the often used keys, thereby generating a personalized input panel suitable for the user, wherein the often used keys are keys more likely clicked onto by users, e.g., character keys with a higher user click frequency, etc.

Preferably, the user equipment may also calculate the location of the area that is easily mis-touched by the user based on the hand shape feature information of the user, so as to lower the touch sensibility of respective keys in the area that is easily mis-touched. For example, the hand shape feature information obtained by the user equipment includes that the little finger of the user being relatively shot, then the user equipment may calculate the area which is easily touched by the little finger as the area that is easily mis-touched by the user, so as to lower the touch sensibility of respective keys in the area that is easily mis-touched and prevent mis-input caused by mis-touch of the user. Herein, the touch sensitivity indicates the sensitive degree of the user equipment with respect to the user's touch operation. Generally, the higher the touch sensitivity is, the easier the touch operation performed by the user is detected, and the lower the touch sensitivity is, the more difficult the touch operation performed by the user is detected.

It should be noted that the above example is only for better understanding the technical solution of the present invention, not intended to limit the present invention. Those skilled in the art should understand, any implementation manner of directly calculating the locations of respective keys in the personalized input panel based on the user' hand shape feature information so as to generate a personalized input panel suitable for the user should be included within the scope of the present invention.

2) the user equipment adjusts a predefined input panel based on the hand shape feature information, to obtain the personalized input panel. Preferably, the predefined input panel is adapted to the predetermined hand shape information, Herein, the operation of adjusting the predefined input panel may include any operation on the layout of the predefined input panel. Preferably, the operation of adjusting the predefined input panel includes, but not limited to, a) adjusting the locations of often used keys of the predefined input panel, e.g., adjusting the locations of often used keys leftward or rightward, etc.; b) adjusting the touch sensitivity of part(s) of area(s) in the predefined input panel, e.g., down-adjusting the touch sensitivity such that the user needs a heavier touch to cause the user equipment to determine that the keys are pressed by the user; preferably, the area whose sensitivity is adjusted is an area which is much easier to be mis-touched by the user in the predefined input panel and determined based on the hand shape feature information.

Herein, the user equipment may adopt a plurality of manners to adjust the predefined input panel based on the hand shape feature information, thereby obtaining the personalized input panel.

For example, the user equipment determines, based on the length proportion features between respective fingers in the hand shape feature information, that the user's little finger and index finger are relatively short, then the user equipment moves the locations that are easily touched by the little finger and index finger, such that the locations of such keys are closer to the locations of the keys that the middle finger and the ring finger easily touch, etc.

It should be noted that during the process of generating a personalized input panel, the user equipment may further determine the locations of respective keys in the personalized input panel in further conjunction with the size of the area that can display the personalized input panel. For example, the user equipment is a mobile device; the size of the area that can display the personalized input panel on the mobile device is 12*6 cm; then respective keys in the personalized input panel determined by the user equipment should be located within the area.

It should be noted that the above example is only for better understanding the technical solution of the present invention, not intended to limit the present invention. Those skilled in the art should understand, any implementation manner of adjusting a predefined input panel based on the hand shape feature information so as to obtain the personalized input panel should be included within the scope of the present invention.

According to the solution of the present embodiment, the user equipment compares the hand shape information of the user and standard hand shape information, obtains an input panel satisfying the user's personalized demands, enhances the accuracy of the user's touch operations on the input panel, and thus lowers the possibility of occurrence of input operations caused by mistouch of the user; besides, by displaying the location indication information on the screen, the user equipment lets the user to try best to place a hand within the location indication information when shooting the hand shape image, so as to better control the distance between the hand and the camera lens, thereby reducing the impact of the location of the hand on analyzing, by the user equipment, the obtained hand shape image when the user is shooting the hand shape image.

Figure 2:
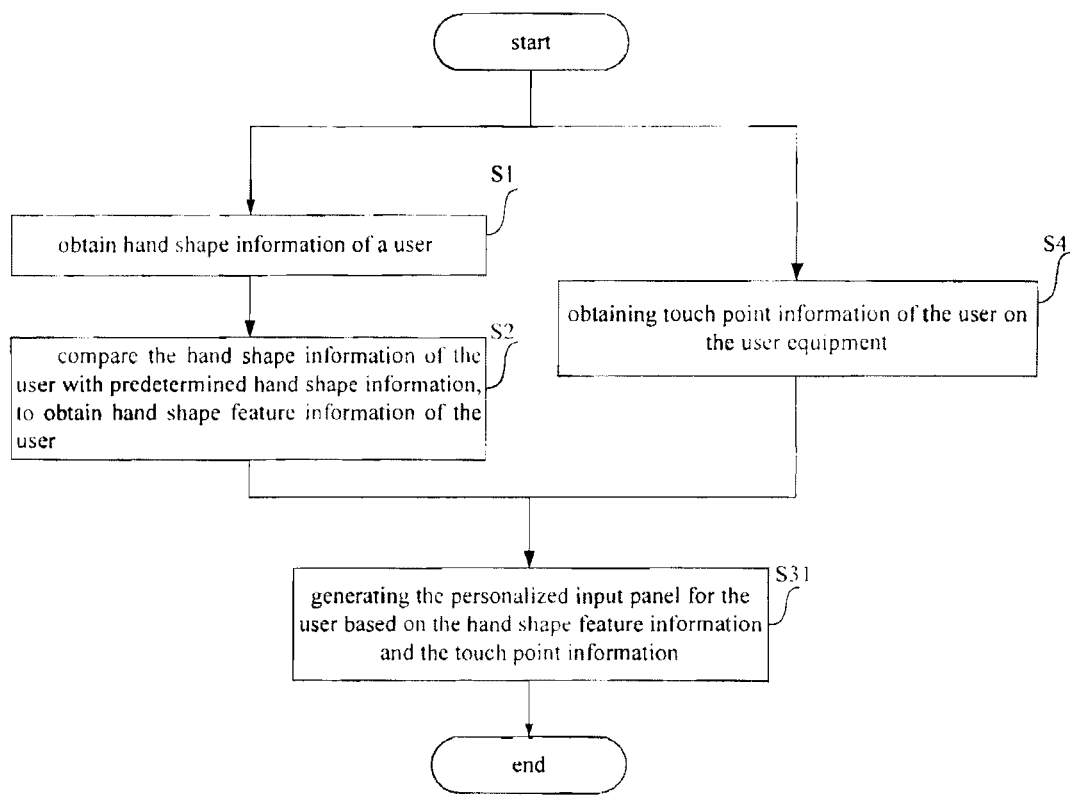
FIG. 2 shows a flow diagram of a method for generating a personalized input panel in a user equipment according to another preferred embodiment of the present invention.

FIG. 2 shows a flow diagram of a method for generating a personalized input panel in a user equipment according to another preferred embodiment of the present invention. The method in this embodiment is mainly implemented through a user equipment; wherein any explanations on the user equipment in the embodiment with reference to FIG. 1 is incorporated in the present embodiment by reference, wherein the method according to the present embodiment comprises step S1, step S2, step S3, and step S4; wherein step S3 further comprises step S31, wherein steps S1 and S2 have been described in detail in the embodiment shown with reference to FIG. 1, which will not be detailed here.

Hereinafter, step S4 and step S31 of this embodiment will be described in detail.

In step S4, the user equipment obtains touch point information of the user on the user equipment.

Herein, the touch point information includes any information about touch points on the user equipment. Preferably, the touch point information includes, but not limited to, the following:

1) location information of touch points on the user equipment

Preferably, often used keys on the input panel as previously displayed may be determined based on the location information of touch points on the user equipment in conjunction with the information of the input panel previously displayed by the user equipment. For example, the keys corresponding to locations with high touch rate are defined as often used keys, etc.

2) shape information of touch points

Preferably, the user equipment obtains the shape information of the touch points of the thumb of the user on the user equipment; since the touch point of the thumb on the screen is not an exact round or nearly an exact round, the user equipment may determine whether the touch point is a thumb touch point through the shape of the touch point, and may also determine whether the user uses a left hand or a right hand based on the shape information of the touch point of the thumb on the user equipment.

Specifically, the implementation manner in which the user equipment obtains the touch point information of the user on the user equipment includes, but not limited to:

a) the user equipment obtains the historical touch point information of the user on the user equipment.

For example, the user equipment obtains the touch point information recorded by it previously and of the user on the predefined input panel.

b) the user equipment prompts the user to pre-entry one or more letters on the predefined input panel, and uses the touch point information in the pre-input operation as the user's touch point information on the user equipment.

For example, the user equipment prompts the user to randomly input on the predefined input panel, and uses the touch point information inputted by the user within a predetermined period of time as the user's touch point information on the user equipment.

It should be noted that the above example is only for better understanding the technical solution of the present invention, not intended to limit the present invention. Those skilled in the art should understand, any implementation manner of obtaining the touch point information of the user on the user equipment should be included within the scope of the present invention.

In step S31, the user equipment generates the personalized input panel for the user based on the hand shape feature information and the touch point information.

Specifically, the implementation manner in which the user equipment generates a personalized input panel for the user based on the hand shape feature information and the touch point information includes, but not limited to:

1) the user equipment directly calculates the locations of respective keys in the personalized input panel based on the hand shape feature information and touch point information of the user, to generate a personalized input panel adapted for the user.

For example, the user's hand shape feature information includes that the overall length-width ratio of the hand of the user is relatively large; the touch point information includes shape information of a plurality of touch points; then, based on the shape information of a plurality of touch points, the user equipment identifies shape(s) that is not exactly round or nearly exact round as the shape of the touch point(s) pressed by the thumb and determines that the user uses a right hand based on the shape: moreover, the user equipment calculates initial locations of the often used keys in the input panel based on the overall length-width ratio of the hand of the user; next, the user equipment offsets respective often used keys from their initial towards the right; next, the user equipment calculates the locations of other non-often used keys based on the locations of the often used keys whose locations have been moved rightward, thereby generating a personalized input panel adapted for the user.

It should be noted that the user equipment may also calculate area(s) that is easily mis-touched by a user based on the hand shape feature information of the user, and lowers the touch sensitivity of the keys within this area(s).

2) the user equipment adjust a predefined input panel based on the hand shape feature information and touch point information, to obtain the personalized input panel, wherein the operations that can be performed on the predefined input panel have been described in detail in step S3 in FIG. 1, which will not be detailed here.

Herein, the user equipment may adopt a plurality of manners to adjust the predefined input panel based on the hand shape feature information and touch point information, thereby obtaining the personalized input panel.

For example, the hand shape feature information includes that the proportion of the fingers over the length of whole hand is relatively low; besides the user equipment determines based on the touch point information that the user uses right hand; then the user equipment offsets the locations of often used keys on the predefined user equipment rightward, such that for a user whose finger movement distance is limited due to shorter fingers, through rightward offset of the often used keys, the distance of the user for moving fingers can be reduced, such that he/she is easier to touch the keys.

For another example, the hand shape feature information includes that the width of the palm is relatively wide, and the user equipment determines based on the hand shape feature information that the user uses a left hand; then the user equipment lowers the touch sensibility of a series of keys in the left-most side of the predefined input panel, thereby the possibility of mis-touching, by the user, the edge area in the input panel will be reduced.

It should be noted that the above example is only for better understanding the technical solution of the present invention, not intended to limit the present invention. Those skilled in the art should understand any implementation manner of generating a personalized input panel adapted for the user based on the hand shape feature information and the touch point information should be included within the scope of the present invention.

According to the solution of this embodiment, the user equipment may adjust the input panel in conjunction with the user's hand shape feature information and the touch point information, so as to generate a personalized input panel satisfying the user's needs, such that the generated personalized input panel can more satisfy the user's use habits.

Figure 3:
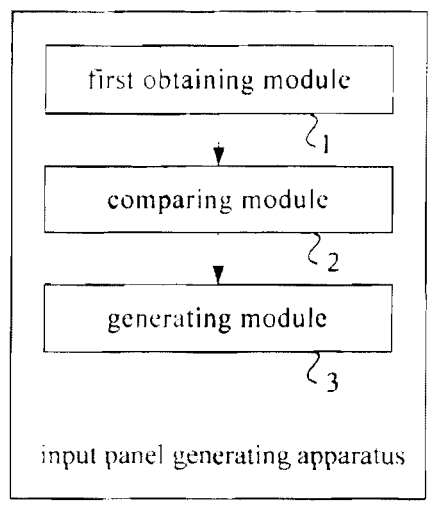
FIG. 3 shows a structural block diagram of an input panel generating apparatus for generating a personalized input panel in a user equipment according to one preferred embodiment of the present invention.

FIG. 3 shows a structural block diagram of an input panel generating apparatus for generating a personalized input panel in a user equipment according to one preferred embodiment of the present invention, wherein the input panel generating apparatus comprises a first obtaining module 1, a comparing module 2, and a generating module 3. Preferably, the input panel generating apparatus is incorporated in the user equipment.

The first obtaining module 1 obtains hand shape information of a user.

Herein, the hand shape information includes any information that can reflect the information of the shape of the hand. Preferably, the hand shape information includes, but not limited to: the overall length-width ratio of the hand, the proportion of the fingers over the length of the whole hand; the thickness of the fingers; the width of the palm; and length proportion between respective fingers, etc.

Specifically, the implementation manners for the first obtaining module 1 to obtain the hand shape information of the user include, but not limited to, the following:

1) the first obtaining module 1 directly obtains the hand shape information of the user stored in the user equipment.

For example, the user equipment may pre-store his/her hand shape information into the user equipment; then the first obtaining module 1 may directly obtain the hand shape information of the user as stored in the user equipment when the user uses the user equipment to generate a personalized input panel.

It should be noted that the above example is only for better illustrating the technical solution of the present invention, not intended to limit the present invention. Those skilled in the art should understand that any implementation manner of directly obtaining the hand shape information of the user stored in the user equipment should be included within the scope of the present invention.

2) the first obtaining module 1 obtains the hand shape information of the user stored in the network device.

For example, the user may pre-store its hand shape information in a network device; then the first obtaining module 1 may obtain the hand shape information of the user stored in the network device by accessing the network device when the user uses the user equipment to generate a personalized input panel.

It should be noted that the above example is only for better illustrating the technical solution of the present invention, not intended to limit the present invention. Those skilled in the art should understand that any implementation manner of obtaining the hand shape information of the user from a network device should be included within the scope of the present invention.

3) the first obtaining module 1 obtains the hand shape information of the user based on the image shot by the user. In this embodiment, the first obtaining module 1 further comprises a sub-obtaining module (not shown) and a extracting module (not shown).

The sub-obtaining module obtains a hand shape image shot by the user.

Herein, the manner in which the sub-obtaining module obtains a hand shape image shot by the user includes, but not limited to:

a) the sub-obtaining module extracts a hand-shape image shot by the user from among images already stored in the user equipment.

For example, the sub-obtaining module extracts a certain hand shape image from album of the user equipment as the hand shape image shot by the user according to the user's selection.

b) sub-obtaining module further comprises a displaying module (not shown) and an image obtaining module (not shown).

The displaying module invokes a camera of the user equipment and displays location indication information on the screen, wherein the location indication information is for indicating an appropriate location of a hand on the screen. For example, the location indication information may be embodied as a shape of a hand or a block; preferably, the location indication information is embodied as a shape of a standard hand shape.

Preferably, the camera of the displaying module invoked by the user equipment is a front-facing camera.

Next, the user may put a hand before the camera, and after the hand displayed on the screen is located at an appropriate location indicated by the location indication information, the shooting operation is performed.

Next, the image obtaining module obtains the hand shape image based on the shooting operation of the user.

For example, the displaying module invokes its front camera and displays a block indicating an appropriate location of the hand on the screen; and the image obtaining module obtains the hand shape image in the block based on the user's shooting operation on the image of the hand placed within the block through the front camera.

It should be noted that the above example is only for better understanding the technical solution of the present invention, not intended to limit the present invention. Those skilled in the art should understand, any implementation manner of obtaining the hand shape image shot by the user should be included within the scope of the present invention.

The extracting module extracts the hand shape information from among hand shape images obtained by the sub-obtaining module.

Herein, the extracting module may extract the hand shape information from among hand shape images in a plurality of manners. For example, obtain hand shape information by analyzing the image and extracting the hand shape contour.

It should be noted that the above example is only for better understanding the technical solution of the present invention, not intended to limit the present invention. Those skilled in the art should understand, any implementation manner of extracting the hand shape information from among the hand shape images should be included within the scope of the present invention.

It should be noted that the above example is only for better understanding the technical solution of the present invention, not intended to limit the present invention. Those skilled in the art should understand, any implementation manner of obtaining the hand shape information of the user should be included within the scope of the present invention.

The comparing module 2 compares the hand shape information of the user with predetermined hand shape information, to obtain hand shape feature information of the user. Wherein, the predetermined hand shape information may be hand shape information of a standard hand.

Wherein, the hand shape feature information may include the feature information corresponding to the hand shape information. Preferably, the hand shape feature information includes, but not limited to: the overall length-width ratio feature of the hand; the proportion feature of the fingers over the length of the overall hand; the thickness feature of fingers; the width feature of the palm; the length proportion feature between respective fingers, etc.

For example, the comparing module 2 compares the hand shape information of the user with predetermined hand shape information, obtaining that the proportion of the fingers of the user over the length of the whole hand is lower than the proportion of the fingers over the length of the whole hand in a standard hand shape, then the hand shape feature information of the user as obtained by the comparing module 2 is that the proportion of the fingers over the length of the whole hand is relatively low.

It should be noted that the above example is only for better understanding the technical solution of the present invention, not intended to limit the present invention. Those skilled in the art should understand, any implementation manner of comparing the hand shape information of the user with the predetermined hand shape information to obtain the hand shape feature information of the user should be included within the scope of the present invention.

The generating module 3 generates a personalized input panel for the user based on the hand shape feature information.

Specifically, the implementation manner of generating, by the generating module 3, a personalized input panel adapted for the user based on the hand shape feature information includes, but not limited to:

1) the generating module 3 directly calculates the locations of respective keys in the personalized input panel based on the hand shape feature information of the user, so as to generate a personalized input panel suitable for the user.

For example, the hand shape feature information of the user obtained by the comparing module 2 is that the overall length-width ratio of the user is relatively large, then the generating module 3 first calculates the locations of often used keys in the input panel based on the overall length-width ratio of the hand of the user, and then calculates the locations of other non-often used keys based on the determined locations of the often used keys, thereby generating a personalized input panel suitable for the user, wherein the often used keys are keys more likely clicked onto by users, e.g., character keys with a higher user click frequency, etc.

Preferably, the generating module 3 may also calculate the location of the area that is easily mis-touched by the user based on the hand shape feature information of the user, so as to lower the touch sensibility of respective keys in the area that is easily mis-touched. For example, the hand shape feature information obtained by the comparing module 2 includes that the little finger of the user being relatively shot, then the generating module 3 may calculate the area which is easily touched by the little finger as the area that is easily mis-touched by the user, so as to lower the touch sensibility of respective keys in the area that is easily mis-touched and prevent mis-input caused by mis-touch of the user. Herein, the touch sensitivity indicates the sensitive degree of the user equipment with respect to the user's touch operation. Generally, the higher the touch sensitivity is, the easier the touch operation performed by the user is detected, and the lower the touch sensitivity is, the more difficult the touch operation performed by the user is detected.

It should be noted that the above example is only for better understanding the technical solution of the present invention, not intended to limit the present invention. Those skilled in the art should understand, any implementation manner of directly calculating the locations of respective keys in the personalized input panel based on the user' hand shape feature information so as to generate a personalized input panel suitable for the user should be included within the scope of the present invention.

2) the generating module 3 comprises a first adjusting module (not shown). The first adjusting module adjusts a predefined input panel based on the hand shape feature information, to obtain the personalized input panel. Preferably, the predefined input panel is adapted to the predetermined hand shape information.

Herein, the operation of adjusting the predefined input panel may include any operation on the layout of the predefined input panel. Preferably, the operation of adjusting the predefined input panel includes, but not limited to, a) adjusting the locations of often used keys of the predefined input panel, e.g., adjusting the locations of often used keys leftward or rightward, etc.; b) adjusting the touch sensitivity of part(s) of area(s) in the predefined input panel, e.g., down-adjusting the touch sensitivity such that the user needs a heavier touch to cause the user equipment to determine that the keys are pressed by the user; preferably, the area whose sensitivity is adjusted is an area which is much easier to be mis-touched by the user in the predefined input panel and determined based on the hand shape feature information.

Herein, the first adjusting module may adopt a plurality of manners to adjust the predefined input panel based on the hand shape feature information, thereby obtaining the personalized input panel.

For example, the first adjusting module determines, based on the length proportion features between respective fingers in the hand shape feature information, that the user's little finger and index finger are relatively short, then the first adjusting module moves the locations that are easily touched by the little finger and index finger, such that the locations of such keys are closer to the locations of the keys that the middle finger and the ring finger easily touch, etc.

It should be noted that during the process of generating a personalized input panel, the generating module 3 may further determine the locations of respective keys in the personalized input panel in further conjunction with the size of the area that can display the personalized input panel. For example, the user equipment is a mobile device; the size of the area that can display the personalized input panel on the mobile device is 12*6 cm; then respective keys in the personalized input panel determined by the generating module 3 should be located within the area.

It should be noted that the above example is only for better understanding the technical solution of the present invention, not intended to limit the present invention. Those skilled in the art should understand, any implementation manner of adjusting a predefined input panel based on the hand shape feature information so as to obtain the personalized input panel should be included within the scope of the present invention.

According to the solution of the present embodiment, the user equipment compares the hand shape information of the user and standard hand shape information, obtains an input panel satisfying the user's personalized demands, enhances the accuracy of the user's touch operations on the input panel, and thus lowers the possibility of occurrence of input operations caused by mistouch of the user; besides, by displaying the location indication information on the screen, the user equipment lets the user to try best to place a hand within the location indication information when shooting the hand shape image, so as to better control the distance between the hand and the camera lens, thereby reducing the impact of the location of the hand on analyzing, by the user equipment, the obtained hand shape image when the user is shooting the hand shape image.

Figure 4:
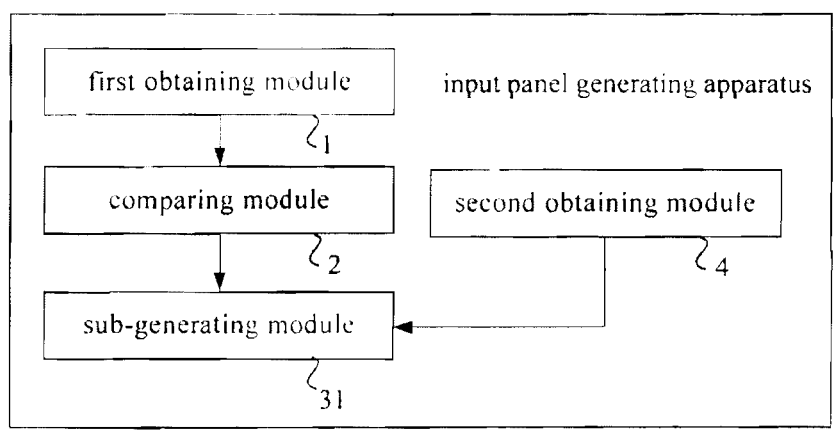
FIG. 4 shows a structural block diagram of an input panel generating apparatus for generating a personalized input panel in a user equipment according to another preferred embodiment of the present invention.

FIG. 4 shows a structural block diagram of an input panel generating apparatus for generating a personalized input panel in a user equipment according to another preferred embodiment of the present invention, wherein the input panel generating apparatus of the present embodiment comprises a first obtaining module 1, a comparing module 2, a generating module 3, and a second obtaining module 4, wherein the generating module 3 further comprises a sub-generating module 31, wherein the first obtaining module 1 and the comparing module 2 have been described in detail, which will not be detailed here.

Hereinafter, the second obtaining module 4 and the sub-generating module 31 according to the present embodiment will be described in detail.

The second obtaining module 4 obtains touch point information of the user on the user equipment.

Herein, the touch point information includes any information about touch points on the user equipment. Preferably, the touch point information includes, but not limited to, the following:

1) location information of touch points on the user equipment

Preferably, often used keys on the input panel as previously displayed may be determined based on the location information of touch points on the user equipment in conjunction with the information of the input panel previously displayed by the user equipment. For example, the keys corresponding to locations with high touch rate are defined as often used keys, etc.

2) shape information of touch points

Preferably, the second obtaining module 4 obtains the shape information of the touch points of the thumb of the user on the user equipment; since the touch point of the thumb on the screen is not an exact round or nearly an exact round, the second obtaining module 4 may determine whether the touch point is a thumb touch point through the shape of the touch point, and may also determine whether the user uses a left hand or a right hand based on the shape information of the touch point of the thumb on the user equipment, Specifically, the implementation manner in which the second obtaining module 4 obtains the touch point information of the user on the user equipment includes, but not limited to:

a) the second obtaining module 4 obtains the historical touch point information of the user on the user equipment.

For example, the second obtaining module 4 obtains the touch point information recorded by it previously and of the user on the predefined input panel.

b) the second obtaining module 4 prompts the user to pre-entry one or more letters on the predefined input panel, and uses the touch point information in the pre-input operation as the user's touch point information on the user equipment.

For example, the second obtaining module 4 prompts the user to randomly input on the predefined input panel, and uses the touch point information inputted by the user within a predetermined period of time as the user's touch point information on the user equipment.

It should be noted that the above example is only for better understanding the technical solution of the present invention, not intended to limit the present invention. Those skilled in the art should understand, any implementation manner of obtaining the touch point information of the user on the user equipment should be included within the scope of the present invention.

The sub-generating module 31 generates the personalized input panel for the user based on the hand shape feature information and the touch point information.

Specifically, the implementation manner in which the sub-generating module 31 generates a personalized input panel for the user based on the hand shape feature information and the touch point information includes, but not limited to:

1) the sub-generating module 31 directly calculates the locations of respective keys in the personalized input panel based on the hand shape feature information and touch point information of the user, to generate a personalized input panel adapted for the user.

For example, the user's hand shape feature information includes that the overall length-width ratio of the hand of the user is relatively large; the touch point information includes shape information of a plurality of touch points; then, based on the shape information of a plurality of touch points, the sub-generating module 31 identifies shape(s) that is not exactly round or nearly exact round as the shape of the touch point(s) pressed by the thumb and determines that the user uses a right hand based on the shape; moreover, the user equipment calculates initial locations of the often used keys in the input panel based on the overall length-width ratio of the hand of the user: next, the sub-generating module 31 offsets respective often used keys from their initial locations towards the right; next, the sub-generating module 31 calculates the locations of other non-often used keys based on the locations of the often used keys whose locations have been moved rightward, thereby generating a personalized input panel adapted for the user.

It should be noted that the sub-generating module 31 may also calculate area(s) that is easily mis-touched by a user based on the hand shape feature information of the user, and lowers the touch sensitivity of the keys within this area(s).

2) the sub-generating module 31 comprises a second adjusting module (not shown). The second adjusting module adjust a predefined input panel based on the hand shape feature information and touch point information, to obtain the personalized input panel, wherein the operations that can be performed on the predefined input panel have been described in detail in the description of generating module 3 shown in FIG. 1, which will not be detailed here.

Herein, the second adjusting module may adopt a plurality of manners to adjust the predefined input panel based on the hand shape feature information and touch point information, thereby obtaining the personalized input panel.

For example, the hand shape feature information includes that the proportion of the fingers over the length of whole hand is relatively low; besides the second adjusting module determines based on the touch point information that the user uses right hand; then the second adjusting module offsets the locations of often used keys on the predefined user equipment rightward, such that for a user whose finger movement distance is limited due to shorter fingers, through rightward offset of the often used keys, the distance of the user for moving fingers can be reduced, such that he/she is easier to touch the keys.

For another example, the hand shape feature information includes that the width of the palm is relatively wide, and the second adjusting module determines based on the hand shape feature information that the user uses a left hand; then the second adjusting module lowers the touch sensibility of a series of keys in the left-most side of the predefined input panel, thereby the possibility of mis-touching, by the user, the edge area in the input panel will be reduced.

It should be noted that the above example is only for better understanding the technical solution of the present invention, not intended to limit the present invention. Those skilled in the art should understand any implementation manner of generating a personalized input panel adapted for the user based on the hand shape feature information and the touch point information should be included within the scope of the present invention.

According to the solution of this embodiment, the input panel generating apparatus may adjust the input panel in conjunction with the user's hand shape feature information and the touch point information, so as to generate a personalized input panel satisfying the user's needs, such that the generated personalized input panel can more satisfy the user's use habits.

It should be noted that the present invention may be implemented in software and/or a combination of software and hardware. For example, various modules according to the present invention may be implemented by an application-specific integrated circuit (ASIC) or any other similar hardware devices. In one embodiment, the software program of the present invention may be executed by a processor to perform the above steps or functions. Likewise, the software JO program of the present invention (including the relevant data structure) may be stored in a computer-readable recording medium, e.g., RAM memory, magnetic or optical driver or soft floppy or a similar device. Additionally, some steps or functions of the present invention may be implemented using hardware, e.g., as a circuit cooperating with the processor t perform various functions or steps.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method for generating a personalized input panel for a user equipment, comprising:
    obtaining hand shape information of a user, the hand shape information including an overall length-width ratio of the hand and at least one of the following:
        a proportion of fingers over a length of a whole hand;
        a width of a palm; or
        a length proportion between respective fingers;
    comparing the hand shape information of the user with predetermined hand shape information, to obtain hand shape feature information of the user;
    obtaining touch point information of the user on the user equipment, the touch point information including at least one of the following: location information of touch points on the user equipment; or shape information of the touch points; and
    generating a personalized input panel for the user based on the hand shape feature information and the touch point information, comprising: calculating locations of often used keys in the input panel based on the overall length-width ratio of the hand of the user, and calculating the locations of other non-often used keys based on the determined locations of the often used keys.

2. The method according to claim 1, wherein the step of generating comprises:
    adjusting a predefined input panel based on the hand shape feature information, to obtain the personalized input panel.

3. The method according to claim 2, wherein the operation of adjusting the predefined input panel comprises:
    adjusting locations of often used keys of the predefined input panel; and
    adjusting touch sensitivity of part(s) of area(s) in the predefined input panel.

4. The method according to claim 1, wherein the step of generating comprises:
    adjusting a predefined input panel based on the hand shape feature information and the touch point information, to obtain the personalized input panel.

5. The method according to claim 1, wherein the step of obtaining hand shape information comprises:
    obtaining a hand shape image shot by the user; and
    extracting the hand shape information from the hand shape image.

6. The method according to claim 5, wherein the step of obtaining hand shape image comprises:
    invoking a camera of the user equipment and displaying location indication information on a screen, which location indication information is for indicating an appropriate location on the screen for a hand; and
    obtaining the hand shape image based on an imaging operation of the user.

7. The method according to claim 1, wherein the method further comprises:
    calculating an area that is easily mis-touched by the user based on the hand shape feature information; and
    lowering touch sensitivity of keys in the area, the touch sensitivity indicating the sensitive degree of the user equipment with respect to the user's touch operation.

8. An input panel generating apparatus for generating a personalized input panel in a user equipment, comprising:
    a first obtaining module configured to obtain hand shape information of a user, the hand shape information including an overall length-width ratio of the hand and at least one of the following:
        a proportion of fingers over a length of a whole hand;
        a width of a palm; or
        a length proportion between respective fingers;
    a comparing module configured to compare the hand shape information of the user with predetermined hand shape information, to obtain hand shape feature information of the user;
    a second obtaining module configured to obtain touch point information of the user on the user equipment, the touch point information including at least one of the following: location information of touch points on the user equipment; or shape information of the touch points; and
    a generating module configured to generate a personalized input panel for the user based on the hand shape feature information by calculating locations of often used keys in the input panel based on the overall length-width ratio of the hand of the user, and calculating the locations of other non-often used keys based on the determined locations of the often used keys, the generating module comprising a sub-generating module configured to generate the personalized input panel for the user based on the hand shape feature information and the touch point information.

9. The input panel generating apparatus according to claim 8, wherein the generating module further comprises:
    an adjusting module configured to adjust a predefined input panel based on the hand shape feature information, to obtain the personalized input panel.

10. The input panel generating apparatus according to claim 9, wherein the operation of adjusting the predefined input panel comprises:
    adjusting locations of often used keys of the predefined input panel; and
    adjusting touch sensitivity of part(s) of area(s) in the predefined input panel.

11. The input panel generating apparatus according to claim 8, wherein the sub-generating module comprises:
    an adjusting module configured to adjust a predefined input panel based on the hand shape feature information and the touch point information, to obtain the personalized input panel.

12. The input panel generating apparatus according to claim 8, wherein the first obtaining module comprises:
  a sub-obtaining module configured to obtain a hand shape image shot by the user; and
  an extracting module configured to extract the hand shape information from the hand shape image.

13. The input panel generating apparatus according to claim 12, wherein the sub-obtaining module comprises:
  a displaying module configured to invoke a camera of the user equipment and display location indication information on a screen, which location indication information is for indicating an appropriate location on the screen for a hand; and
  an image obtaining module configured to obtain the hand shape image based on an imaging operation of the user.

14. The input panel generating apparatus according to claim 8, wherein the apparatus further comprises:
  a calculation module configured to calculate an area that is easily mis-touched by the user based on the hand shape feature information; and
  a sensitivity adjustment module configured to lower touch sensitivity of keys in the area, the touch sensitivity indicating the sensitive degree of the user equipment with respect to the user's touch operation.

15. A non-transitory computer-readable storage medium containing instructions, that when executed, control a computer system to be configured for:
  obtaining hand shape information of a user, the hand shape information including an overall length-width ratio of the hand and at least one of the following:
    a proportion of fingers over a length of a whole hand;
    a width of a palm; or
    a length proportion between respective fingers;
  comparing the hand shape information of the user with predetermined hand shape information, to obtain hand shape feature information of the user;
  obtaining touch point information of the user on the user equipment, the touch point information including at least one of the following: location information of touch points on the user equipment; or shape information of the touch points; and
  generating a personalized input panel for the user based on the hand shape feature information and the touch point information, comprising: calculating locations of often used keys in the input panel based on the overall length-width ratio of the hand of the user, and calculating the locations of other non-often used keys based on the determined locations of the often used keys.

16. The non-transitory computer-readable storage medium according to claim 15, wherein the obtaining hand shape information comprises:
  obtaining a hand shape image shot by the user; and
  extracting the hand shape information from the hand shape image.

17. The non-transitory computer-readable storage medium according to claim 15, wherein the operations further comprise:
  calculating an area that is easily mis-touched by the user based on the hand shape feature information; and
  lowering touch sensitivity of keys in the area, the touch sensitivity indicating the sensitive degree of the user equipment with respect to the user's touch operation.

* * * * *